Patented Feb. 15, 1938

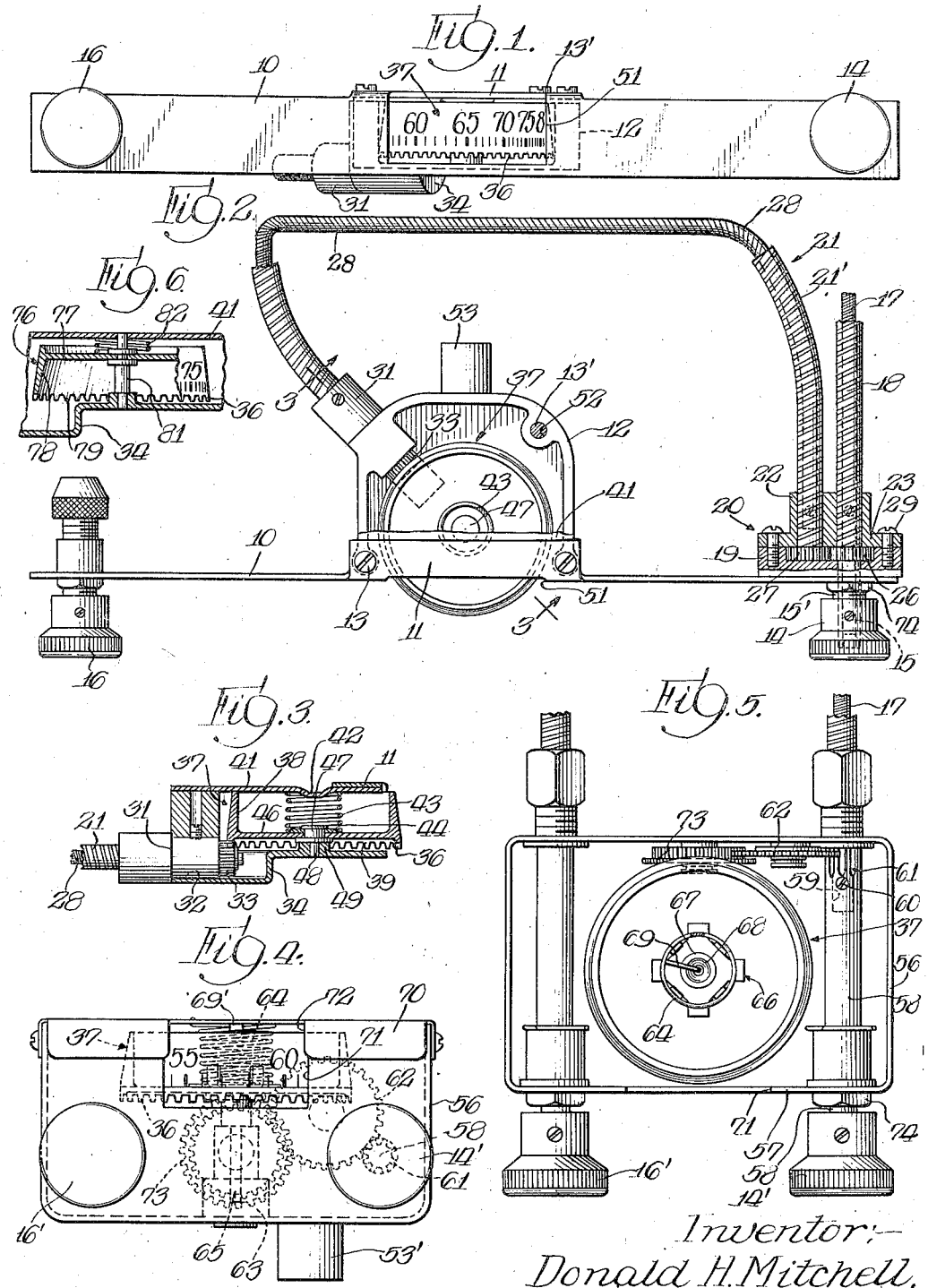

2,108,408

UNITED STATES PATENT OFFICE 2,108,408

CONTROL DEVICE

Donald H. Mitchell, Chicago, Ill., assignor to Galvin Manufacturing Corporation, Chicago, Ill., a corporation of Illinois Application March 9, 1937, Serial No. 129,868

5 Claims. (Cl. 116—124.4)

My invention relates in general to control apparatus and more in particular to a control head for the remote control of a radio receiver mounted upon an automobile or like vehicle.

With the present trend toward somewhat elaborate instrument panels for automobiles, and with all of the mechanism on the instrument panels, it has become quite a problem to mount a control unit for a radio receiver thereon in a manner to suitably fit into the assembly of instruments on the panel and positioned thereon so that the indicator and control knobs are readily visible and accessible, yet providing a neat and artistic appearance in relation to the entire layout of the instrument panel.

With the necessity of reducing the cost of the complete radio receiver system to as low an amount as possible, it is desirable to provide as simple and inexpensive apparatus in the control head as is consistent with efficient and satisfactory operation thereof. Inasmuch as the control apparatus for a radio receiver is ordinarily the only part of that receiver which is visible to the operator, it is desirable at least from a sales standpoint, to have such control apparatus unique as well as attractive in appearance.

It is an object of the present invention to provide a simplified and improved control apparatus.

A further object is to provide the invention embodied in an apparatus such as may be readily mounted on the instrument panel of an automobile and immediately accessible for control operations, as well as being clearly visible to the operator of the apparatus.

One of the features of the invention is the provision of a one-piece molded indicator or dial having gear teeth thereon for driving engagement in the control apparatus.

A further feature of the invention is the provision of a flexible cable from a control shaft of the apparatus to the indicator or dial of the same, providing in effect remote control for the indicator from such control shaft, thus permitting the separation of such elements of the apparatus over a wide range of distances.

Other objects and features of the invention will be apparent from the following description, taken with the drawing, in which:

Fig. 1 illustrates a front elevation of one embodiment of the invention. The illustration is three-fourths actual size of a commercial embodiment of the invention.

Fig. 2 is a top plan view of the structure of Fig. 1 with portions cut away to more satisfactorily illustrate the complete assembly.

Fig. 3 is a fragmentary sectional view along the line 3—3 of Fig. 2.

Fig. 4 is a front elevation of a modified embodiment of the invention illustrated in actual size according to a commercial embodiment of the invention.

Fig. 5 is a top plan view of the structure of Fig. 4, with the top of the housing for the control apparatus removed.

Fig. 6 is a fragmentary sectional view of a modified embodiment of the indicating apparatus.

In practicing the invention, I provide control apparatus including a mounting plate or portion for carrying a plurality of rotatable control knobs having control shafts in connection therewith. Driving means are provided between one of the control shafts and a rotatable dial or indicator supported at said mounting plate. The dial or indicator of the present invention comprises preferably a one-piece molded or possibly stamped out member with an annular face having indicating figures thereon, and one edge of the face having gear teeth for driving engagement with driving means transmitting power from the control shaft.

Referring to the embodiment of Fig. 1, a mounting plate 10 is provided having an integral flange 11 at right angles therewith for supporting a housing 12 secured thereto by screws 13 or any other appropriate means. The mounting plate 10 is adapted to be mounted on an instrument panel at the rear thereof, with the control knobs 14 and 16 accessible on the front of the instrument panel, and the indicating structure of the apparatus visible in front of the panel. The mounting plate 10 in this commercial embodiment is ten inches long, while the axial centers of the control knobs 14 and 16 are nine inches apart, so that it is apparent that a considerable distance separates the control knob 14 and the housing 12 supporting the indicating mechanism as will be hereinafter described.

A flexible shaft 17 carried in a flexible housing 18 is connected with the control knob 14 through a sleeve 15 which rotates in a threaded collar 15' on the base 19 for a gear housing 20. Said shaft extends to a radio receiver to connect with the tuning condenser therefor. To accomplish a driving connection between the indicating apparatus in the housing 12 and the control shaft 17, a flexible cable 21 is provided and mounted by securing its housing 21' in an apertured projection 22 extending from a cap 23 for the gear housing 20. A gear 26 on the sleeve 15 operated by the knob 14 meshes with a similar gear 27 secured to or keyed on the flexible shaft 28 in the cable housing 21'. The cap 23 is secured to the gear housing 20 by means of screws or bolts 29 and with the cap in place, the gears 26 and 27 are retained in such relation as to provide a satisfactory meshing for transmitting rotation from the control shaft 17 to the driven shaft 28 extending to the indicating apparatus. The gear housing base 20 and its associated cap 23 may each be desirably provided as one-piece die cast members, which members are both extremely sturdy and inexpensive.

The flexible shaft 28 extends through a bushing 31 into the die cast housing 12 through an aperture 32 in the base of the housing. A rubber gear 33 is rigidly secured to the end of the shaft 28 and positioned in a well or cavity 34 in the housing 12 in a manner so as to engage corresponding gear teeth 36 along the lower peripheral edge of a dial and indicator element 37. Back lash between the dial and gear 33 is avoided by providing the latter of rubber and accomplishing a tighter engagement of the gear teeth on each element. The member 37 is preferably molded in a single piece from a phenolic resin composition such as the product known commercially as "Tenite", to provide a cup-shaped structure with an outer annular wall 38 having indicating figures thereon as shown in Fig. 1, and having a downwardly extending flange 39 out of which the gear teeth 36 are formed. A plastic phenolic compound for the material of the dial is very desirable because it permits of many color variations. Furthermore, with a transparent material as above described, the dial lamp illuminates the dial in substantially a glow making the indicating figures very visible, yet causing no glare from the lamp or shadows over the dial. The annular band or wall 38 is of a width sufficient for impressing indicating figures thereon together with a scale, and is at a slight angle with the vertical as shown in Fig. 3 and in dotted lines in Fig. 4 for instance, so that it will be readily visible to an operator sitting in front and above the control device.

A cover plate 41 is secured to the flange 11 to cover the open cup-shaped housing 12 and also cooperates with the flange to support the housing. One preferred manner of securing the plate is by means of spot welding between the flange and the plate. An indentation or embossing 42 appearing as a rounded projection on the under side of the plate 41 is formed thereon in the stamping out of the cover. This serves to center a spring 43 having a coil at the top surrounding this projection and positioned at the bottom over a washer 44 on the base 46 of the cup-shaped dial. The spring provides the necessary pressure and tensioning means to maintain the peripheral gear teeth 36 on the indicator in close engagement with the rubber gear 33 on the driven shaft 28. The washer 44 is retained in position by an upset stud 47 including a pin 48 journalled in an apertured boss 49 in the bottom of the housing 12 to rotatably support the indicator 37.

In one method of assembling the control apparatus of Figs. 1 to 3, the cable or flexible sheath 18 is first secured in the cap 23 for the driving gear housing. The housing 12 may then be mounted on the other end of the cable. Inasmuch as there is a spring tension in the flexible cable 18, it was a problem to overcome this tension, and bend the same to position the housing for mounting on the plate 10. This has been accomplished by assembling the indicator 37 in the housing 12 with the spring 43 centered over the washer 44. As shown in the cross section of Fig. 3, the front of the housing 12 is open and the indicator or dial 37 extends therethrough. The assembled housing and dial mechanism are slipped under the cover 41 with the spring 43 centered by the projection 42 and the dial 37 extending through the aperture 51 as shown in Fig. 2 for instance. The screws 13 are then inserted through appropriate apertures in the flange 11 and similar screws 13' inserted through the cover 41 into a threaded aperture 52 in the wall of the housing to secure the housing to the cover at the rear portion thereof. An integral collar or bushing 53 extends rearwardly from the wall of the housing 12 to removably support a lamp (not shown) for illuminating the dial 37. As previously stated, with a transparent material for the dial, and of the shape indicated, the lamp will very satisfactorily illuminate the dial from this position without causing a glare to the operator, or objectionable shadows.

A modified control head is illustrated in Figs. 4 and 5, utilizing the identical dial 37 shown in the embodiment of Fig. 1, and mounted in a housing having the control shafts in closer relation than in the embodiment of Fig. 1. A one-piece box-like housing 56 is provided for this embodiment, and appropriate bushings are mounted on the front or mounting portion 57 of the housing to carry control knobs 14' and 16'. The flexible drive shaft 17 is in driving connection with the knob 14' by means of an elongated shaft 58 carrying the control knob 14 and extending through the housing from front to rear. A socket 59 is provided at the rear end of the shaft 58 to receive the shaft 17 to be retained therein by screw 60 or similar means. A plurality of teeth 61 machined on the same near the rear end to engage a gear 62 in a speed reducing gear train mounted so that the last gear in the train meshes with the teeth 36 along the lower peripheral edge of the indicator 37. The flexible shaft 17 of course extends to the radio receiver and the indicator or dial operated through the movement of the train of gears shows the adjusted position of the radio receiver as controlled by the movement of the knob 14'. An elongated axis 65 rigidly secured at the center of the indicator 37 is rotatably carried in a bushing 63 in the bottom of the housing 56 as shown in Fig. 4. A spring 64 is centered over a pronged plate 66 centered and retained on the base 46 of the dial by an upset flange 67 around a cavity 68 in the end of the axial stud 65. An arm 69 on the bottom coil of the spring drops into the cavity 68 and engages a prong of the plate (Fig. 5) to remain centered against rotation. The spring is retained against rotation and centered at the top by means of a prong 69' in a corresponding position on the cover 70 for the housing. The prong 69 is pinched over a portion of the top coil of the spring. The dial 37 rotates to the rear of an opening formed by an enlarged slot 71 in the housing 56 and a corresponding slot 72 in the cover. Illumination for the dial is provided by means of a lamp (not shown), removably mounted at a bushing 53' extending from the bottom of the housing 56.

With the spring 64 retained against rotation, a rotary tension is developed as the dial 37 is rotated for indicating purposes. The spring also exerts pressure in a vertical direction. By means of the two forces, the teeth 36 engage more tightly with the last gear 73 in the gear train, and reduce the back lash which would ordinarily develop between the driving mechanism and dial when employing several gears in the gear train.

A modification of the indicator or dial structure is illustrated in Fig. 6. Although this modification is illustrated in connection with a housing corresponding to that in Figs. 1 to 3, it is understood that it may also be adapted to the complete apparatus illustrated in Figs. 4 and 5. A modified dial 76 is substantially cup-shaped, with a base 77 and integral annular side walls 78 in an inverted position. The lower peripheral edge 79 of the member 76 is toothed for driving connection with the control apparatus, as previously discussed. An axis 81 secured in the base 77 and extending upwardly and downwardly to the top 41 and base 36 of the housing rotatably supports the dial in the mounting housing. A spring 82 rests on top of the base 77 between the base and top or cover plate 41 to perform the same function as the spring 43 in the illustration of Fig. 3. It is understood that in providing a molded dial 37 or 76, that either the base 46 or 77 may be formed of a stamped-out metal member molded into the annular walls of the dial or indicator member.

The embodiments of the invention illustrated herein are mounted behind the instrument panel of an automobile with appropriate threaded bushings or nuts 74 at the control knobs for drawing the mounting plate of each embodiment up tightly against the rear of the instrument panel. An appropriate escutcheon plate and transparent covering may be provided on the front of the instrument panel and over an area corresponding to the exposed portion of the indicator 37 to protect the dial, provide visibility, and also provide the desired decorative effect on the front of the instrument panel. A hair line or similar marking on the transparent member in front of the dial may be utilized to read the dial and thus determine the position of the tuning condenser for the radio receiver.

From the above description and from the illustrations, it is apparent, therefore, that my invention provides a simple, one-piece dial having integral driving means for connection with power transmitting means which in turn engage the control shaft extending to the tuning condenser for the radio receiver or to any other controllable apparatus requiring an indicator for showing its adjusted position. The embodiment illustrated in Figs. 1 to 3 shows a remote control so to speak for the dial itself in relation to the control shaft running to the controllable apparatus such as a radio receiver, while in the embodiment of Figs. 4 and 5, the structure is more compact and the dial is driven by a gear train extending over only a very short distance from the control shaft.

Although the invention has been described in its preferred embodiments, it is understood that it is not limited thereby, but rather is limited only by the scope of the appended claims.

I claim:

1. A control device for adjustable apparatus including a covered housing having an opening in the front thereof, indicating means visible through said opening including a drum-shaped dial with driving teeth on one rim edge thereof, control means for said device, driving means intermediate said control means and said toothed edges, and resilient means between said dial and said housing to press said teeth into satisfactory driving connection with said driving means.

2. Control apparatus for radio receivers including a combination housing and mounting means, a control knob and an elongated control shaft in connection with said control knob having a toothed surface at one end, an indicator for said apparatus including a drum-shaped dial rotatably mounted in said housing and mounting means and having gear teeth on one rim thereof, a gear train intermediate said toothed control shaft and said dial for driving the latter, and resilient means between said dial and said housing acting to reduce the back lash in the complete dial and driving mechanism.

3. Control apparatus for a radio receiver including a mounting portion therefor, a one-piece molded indicator comprising a substantially truncated cone-shaped wall having indicating figures on the outside thereof, a radial plate within said wall and integral and substantially at right angles therewith, with said wall having teeth molded in one peripheral rim thereof, driving means extending from the mounting portion to the radio receiver, connection means intermediate said indicator and said driving means including a gear engaging said toothed rim, and means acting to reduce undesirable play in the indicator and driving and connecting structure.

4. Control apparatus for a radio receiver including a mounting portion, a one-piece molded indicator comprising an annular wall having indicating figures on the outside thereof, a radial plate within said wall and integral and substantially at right angles therewith, with said wall having an upper and lower edge and one of said edges having gear teeth provided therein, a control drive shaft extending from the mounting portion to the radio receiver, connecting means between said drive shaft and indicator including a rotatable gear in engagement with said gear teeth, and a coiled spring retained under tension and bearing against the radial plate to reduce undesirable play between the members in the operation of the indicator and driving mechanism.

5. Control apparatus for a radio receiver including an elongated mounting plate, a housing at one end thereof carrying a pair of flexible cables with a flexible drive shaft in each cable, and connecting gears for said shafts rotatable in said housing, an indicator housing on said mounting plate spaced from said first housing, having a one-piece molded indicator rotatably supported therein and comprising an annular wall, an inner radial plate integral with said wall and substantially at right angles thereto, with said wall having a toothed surface in one edge thereof, with one of said flexible drive shafts extending from said first housing to said indicator housing having a pinion gear on the end thereof for engagement with the toothed edge, and spring means bearing on said radial plate to maintain said toothed edge in relatively firm engagement with said pinion gear.

DONALD H. MITCHELL.